(12) United States Patent
Hosseini et al.

(10) Patent No.: US 11,019,573 B2
(45) Date of Patent: May 25, 2021

(54) OUT-OF-ORDER COMMUNICATION MANAGEMENT

(71) Applicant: QUALCOMM Incorporated, San Diego, CA (US)

(72) Inventors: Seyedkianoush Hosseini, San Diego, CA (US); Peter Gaal, San Diego, CA (US); Wei Yang, San Diego, CA (US); Yi Huang, San Diego, CA (US); Wanshi Chen, San Diego, CA (US); Xiao Feng Wang, San Diego, CA (US); Seyed Ali Akbar Fakoorian, San Diego, CA (US); Alexandros Manolakos, San Diego, CA (US); James Beckman, La Jolla, CA (US); Aamod Khandekar, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/805,430

(22) Filed: Feb. 28, 2020

(65) Prior Publication Data

US 2020/0314761 A1 Oct. 1, 2020

Related U.S. Application Data

(60) Provisional application No. 62/826,905, filed on Mar. 29, 2019.

(51) Int. Cl.
*H04W 52/14* (2009.01)
*H04W 52/08* (2009.01)
(Continued)

(52) U.S. Cl.
CPC ......... *H04W 52/143* (2013.01); *H04L 5/0051* (2013.01); *H04L 25/0226* (2013.01);
(Continued)

(58) Field of Classification Search
CPC .............. H04W 52/08; H04W 52/143; H04W 72/1242; H04W 72/1273; H04W 8/24; H04L 25/0226; H04L 5/0051
See application file for complete search history.

(56) References Cited

U.S. PATENT DOCUMENTS

2016/0183203 A1* 6/2016 Larsson .............. H04W 52/386
370/329
2016/0337984 A1* 11/2016 Takeda ................. H04W 52/08
(Continued)

FOREIGN PATENT DOCUMENTS

WO WO-2020168249 8/2020

OTHER PUBLICATIONS

R1-1806303, "Remaining Issues of Non-CA Based Power Control", CATT, May 5, 2018 (Year: 2018).*
(Continued)

*Primary Examiner* — Habte Mered
(74) *Attorney, Agent, or Firm* — Harrity & Harrity, LLP

(57) ABSTRACT

Various aspects of the present disclosure generally relate to wireless communication. In some aspects, a user equipment (UE) may receive a plurality of transmit power control commands identifying a plurality of transmit power values, wherein the plurality of transmit power control commands relate to a set of out-of-order communications. The UE may determine a transmit power for a communication based at least in part on the plurality of transmit power control commands. The UE may transmit the communication based at least in part on the determining the transmit power. Numerous other aspects are provided.

30 Claims, 13 Drawing Sheets

US 11,019,573 B2

Page 2

(51) Int. Cl.
*H04W 8/24* (2009.01)
*H04W 72/12* (2009.01)
*H04L 5/00* (2006.01)
*H04L 25/02* (2006.01)

(52) U.S. Cl.
CPC .............. *H04W 8/24* (2013.01); *H04W 52/08* (2013.01); *H04W 72/1242* (2013.01); *H04W 72/1273* (2013.01)

(56) References Cited

U.S. PATENT DOCUMENTS

| | | | |
|---|---|---|---|
| 2019/0116552 A1* | 4/2019 | Sebeni | H04W 76/28 |
| 2019/0150097 A1* | 5/2019 | Seo | H04W 52/283 370/329 |
| 2019/0166610 A1* | 5/2019 | Lee | H04W 72/1268 |
| 2019/0357197 A1* | 11/2019 | Salah | H04L 1/1854 |
| 2019/0363843 A1* | 11/2019 | Gordaychik | H04W 72/042 |
| 2019/0364511 A1* | 11/2019 | Chen | H04W 52/242 |
| 2020/0053748 A1* | 2/2020 | Hosseini | H04W 72/1242 |
| 2020/0059871 A1* | 2/2020 | Ryu | H04W 76/27 |
| 2020/0267667 A1* | 8/2020 | MolavianJazi | H04W 72/042 |

OTHER PUBLICATIONS

R1-1805637, Mediatek, "Way Forward on UL Power Control Regarding NR Scheduling", Apr. 2018 (Year: 2018).*
R1-1800036, Huawei,HiSilicon,"Summary of remaining issues on HARQ management", 3GPP, Jan. 2018 (Year: 2018).*
Apple Inc: "Support of Out of Order Delivery for eLTE," 3GPP Draft, 3GPP TSG-RAN WG2 Meeting #101bis, R2-1805839_Support of Out of Order Delivery for eLTE_V1, 3rd Generation Partnership Project (3GPP), Mobile Competence Centre, 650, Route Des Lucioles, F-06921, Sophia-Antipolis Cedex, France, vol. RAN WG2. No. Sanya. China; Apr. 16, 2018-Apr. 20, 2018, Apr. 14, 2018 (Apr. 14, 2018), XP051429455, 5 pages, Retrieved from the Internet: URL: http://www.3gpp.org/ftp/Meetings%5F3GPP%5FSYNC/RAN2/Docs/ [retrieved on Apr. 14, 2018], the whole document.
LG Electronics: "Scheduling/HARQ Processing Timeline Enhancements for NR URLLC," 3GPP Draft, 3GPP TSG RAN WG1 Meeting #96, R1-1903242, URLLC Processing Timeline REV2, 3rd Generation Partnership Project (3GPP), Mobile Competence Centre, 650, Route Des Lucioles, F-06921, Sophia-Antipolis Cedex, France, vol. RAN WG1. No. Athens. Greece; Feb. 25, 2019-Mar. 1, 2019, Feb. 22, 2019 (Feb. 22, 2019), XP051600939, 7 pages, Retrieved from the Internet: URL: http://www.3gpp.org/ftp/tsg%5Fran/WG1%5FRL1/TSGR1%5F96/Docs/R1%2D1903242%2Ezip [retrieved on Feb. 22, 2019], section 3.
Mediatek Inc: "Remaining Issues of UL Power Control", 3GPP Draft, 3GPP TSG RAN WG1 RAN1 Meeting #92-Bis, R1-1804069 Remaining Issues of UL Power Control Final, 3rd Generation Partnership Project (3GPP), Mobile Competence Centre, 650 Route Des Lucioles, F-06921 Sophia-Antipolis Cedex, Fran, vol. RAN WG1, No. Sanya, China, Apr. 16, 2018-Apr. 20, 2018, Apr. 15, 2018 (Apr. 15, 2018), XP051426358, 6 Pages, Retrieved from the Internet: URL:http://www.3gpp.org/ftp/Meetings%5F3GPP%5FSYNC/RAN1/Docs/ retrieved on Apr. 15, 2018] the whole document, secitions 2 and 4.
Mediatek Inc: "Remaining Issues of UL Power Control", 3GPP Draft, 3GPP TSG RAN WG1 RAN1 Meeting #93, R1-1807626, Remaining Issues of UL Power Control_REVFINAL, 3rd Generation Partnership Project (3GPP), Mobile Competence Centre, 650, Route Des Lucioles, F-06921, Sophia-Antipolis Cedex, France, vol. RAN WG1. No. Busan. South Korea;May 21, 2018-May 25, 2018, May 24, 2018 (May 24, 2018), XP051463265, 17 pages, Retrieved from the Internet: URL:http://www.3gpp.org/ftp/tsg%5Fran/WG1%5FRL1/TSGR1%5F93/Docs [retrieved on May 24, 2018], sections 2 and 4.
Nokia, et al., "Enhancements to Scheduling/HARQ/CSI Processing Timeline for NR URLLC," 3GPP Draft, 3GPP TSG RAN WG1 Meeting #96, R1-1903570, URLLC Scheduling HARQ Processing Timeline ENH, 3rd Generation Partnership Project (3GPP), Mobile Competence Centre, 650, Route Des Lucioles, F-06921, Sophia-Antipolis Cedex, France, vol. RAN WG1. No. Athens. Greece; Feb. 25, 2019-Mar. 1, 2019, Feb. 27, 2019 (Feb. 27, 2019), XP051601199, 13 pages, Retrieved from the Internet:URL: http://www.3gpp.org/ftp/tsg%5Fran/WG1%5FRL1/TSGR1%5F96/Docs/R1%2D1903570%2Ezip [retrieved on Feb. 27, 2019],proposal 2 in p. 3.
Partial International Search Report—PCT/US2020/020552—ISA/EPO—dated Jun. 25, 2020.
Samsung: "Corrections on UL Power Control", 3GPP Draft, 3GPP TSG RAN WG1 meeting #93, R1-1806743, Corrections on UL Power Control—Samsung, 3rd Generation Partnership Project (3GPP), Mobile Competence Centre, 650, Route Des Lucioles, F-06921, Sophia-Antipolis Cedex, France, vol. RAN WG1. No. Busan. Korea, May 21, 2018-May 25, 2018, May 11, 2018 (May 11, 2018), XP051461949, pp. 1-10, Retrieved from the Internet: URL:http://www.3gpp.org/ftp/tsg%5Fran/WG1%5FRL1/TSGR1%5F93/Docs [retrieved on May 11, 2018], sections 3-5.
Institute for Information Industry (III): "Discussion on Flexible HARQ Scheduling for URLLC", 3GPP Draft, 3GPP TSG RAN WG1 Meeting #95, R1-1813284, Discussion on Flexible HARQ Scheduling for URLLC, 3rd Generation Partnership Project (3GPP), Mobile Competence Centre, 650, Route Des Lucioles, F-06921 Sophia-Antipolis Cedex, vol. RAN WG1, No. Spokane, USA, Nov. 12, 2018-Nov. 16, 2018, Nov. 2, 2018 (Nov. 2, 2018), XP051479583, 6 pages, Retrieved from the Internet: URL: http://www.3gpp.org/ftp/tsg%5Fran/WG1%5FRL1/TSGR1%5F95/Docs/R1%2D1813284%2Ezip. [retrieved on Nov. 2, 2018] sections 2 and 3; p. 2.
International Search Report and Written Opinion—PCT/US2020/020552—ISA/EPO—dated Oct. 5, 2020.
Nokia (Rapporteur): "E-mail Discussion Summary [103bis#41] [NR/IIoT] Intra-UE Prioritization (Nokia)", 3GPP Draft, 3GPP TSG-RAN WG2 #104, R2-1817579, 3rd Generation Partnership Project (3GPP), Mobile Competence Centre, 650, Route Des Lucioles, F-06921 Sophia-Antipolis Cedex, France, Nov. 16, 2018 (Nov. 16, 2018), pp. 1-48, XP051481479, Retrieved from the Internet: URL:http://www.3gpp.org/ftp/tsg%5Fran/WG2%5FRL2/TSGR2%5F104/Docs/R2%2D1817579%2Ezip,http://www.3gpp.org/ftp/tsg%5Fran/WG2%5FRL2/TSGR2%5F104/Docs/R2%2D1817579%2Ezip[retrieved on Nov. 12, 2018] Paragraph [02.1],Sections 2.3 to 2.6.

* cited by examiner

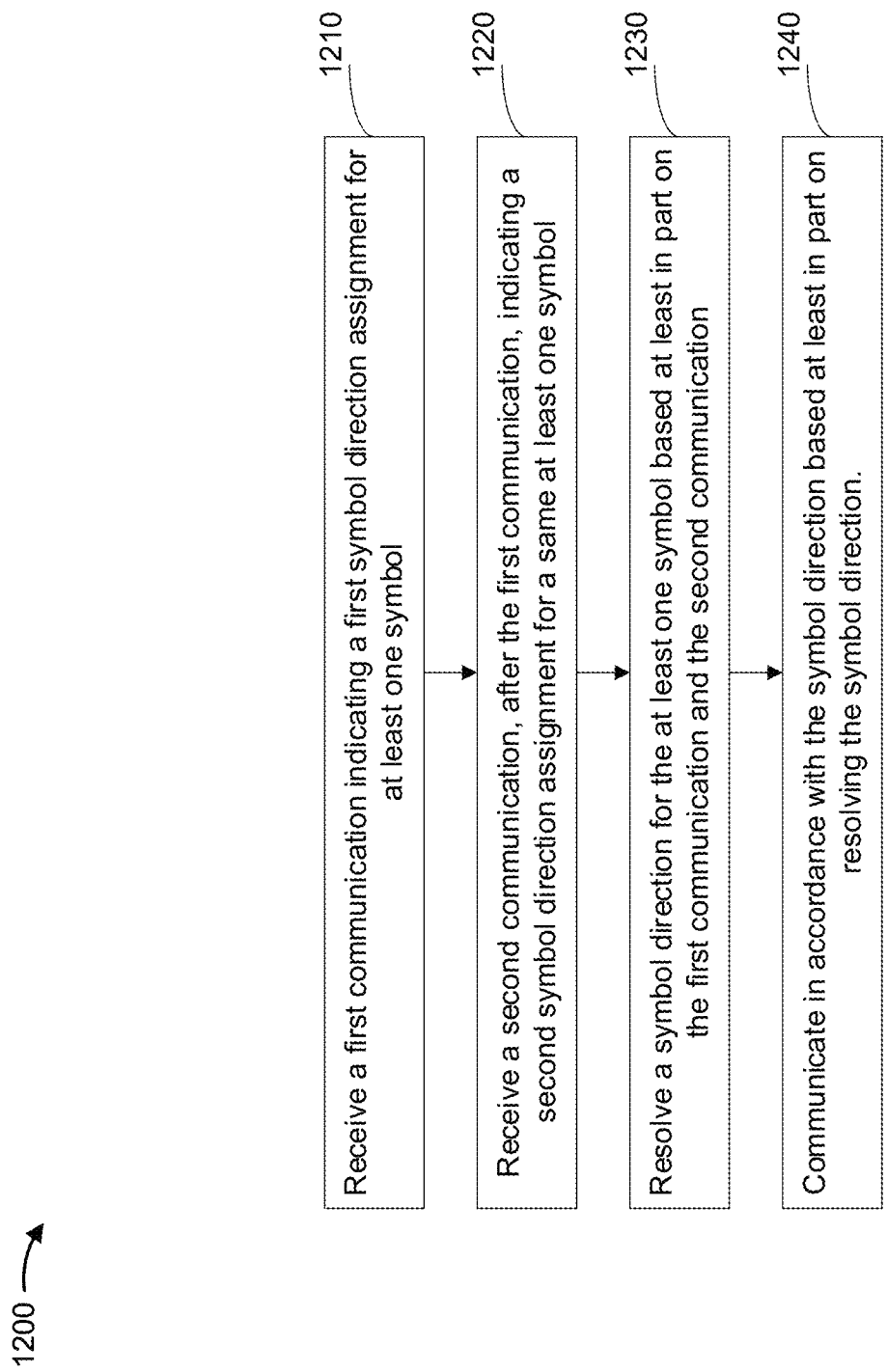

OUT-OF-ORDER COMMUNICATION MANAGEMENT

CROSS-REFERENCE TO RELATED APPLICATION

This Patent Application claims priority to U.S. Provisional Patent Application No. 62/826,905, filed on Mar. 29, 2019, entitled "OUT-OF-ORDER COMMUNICATION MANAGEMENT," and assigned to the assignee hereof. The disclosure of the prior Application is considered part of and is incorporated by reference in this Patent Application.

FIELD OF THE DISCLOSURE

Aspects of the present disclosure generally relate to wireless communication, and more to techniques and apparatuses for out-of-order communication management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a plurality of transmit power control commands identifying a plurality of transmit power values, wherein the plurality of transmit power control commands relate to a set of out-of-order communications; determining a transmit power for a communication based at least in part on the plurality of transmit power control commands; and transmitting the communication based at least in part on the determining the transmit power.

In some aspects, a method of wireless communication, performed by a UE, may include receiving a first communication indicating a first symbol direction assignment for at least one symbol; receiving a second communication, after the first communication, indicating a second symbol direction assignment for the same at least one symbol; resolving a symbol direction for the at least one symbol based at least in part on the first communication and the second communication; and communicating in accordance with the symbol direction based at least in part on resolving the symbol direction.

In some aspects, a method of wireless communication, performed by a UE, may include receiving a plurality of communications, wherein at least one communication of the plurality of communications is an out-of-order communication; determining a processing action for a communication of the plurality of communications based at least in part on a characteristic of the communication; and performing the processing action based at least in part on determining the processing action for the communication.

In some aspects, a UE for wireless communication may include memory and one or more processors operatively coupled to the memory. The memory and the one or more processors may be configured to receive a plurality of transmit power control commands identifying a plurality of transmit power values, wherein the plurality of transmit power control commands relate to a set of out-of-order communications; determine a transmit power for a communication based at least in part on the plurality of transmit power control commands; and transmit the communication based at least in part on the determining the transmit power.

In some aspects, a UE for wireless communication may include memory and one or more processors operatively coupled to the memory. The memory and the one or more processors may be configured to receive a plurality of communications, wherein at least one communication of the plurality of communications is an out-of-order communication; determine a processing action for a communication of the plurality of communications based at least in part on a characteristic of the communication; and perform the processing action based at least in part on determining the processing action for the communication.

In some aspects, a UE for wireless communication may include memory and one or more processors operatively coupled to the memory. The memory and the one or more processors may be configured to receive a first communication indicating a first symbol direction assignment for at least one symbol; receive a second communication, after the first communication, indicating a second symbol direction assignment for the same at least one symbol; resolve a symbol direction for the at least one symbol based at least in part on the first communication and the second communication; and communicate in accordance with the symbol direction based at least in part on resolving the symbol direction.

In some aspects, an apparatus for wireless communication may include means for receiving a first communication indicating a first symbol direction assignment for at least one symbol; means for receiving a second communication, after the first communication, indicating a second symbol direction assignment for the same at least one symbol; means for resolving a symbol direction for the at least one symbol based at least in part on the first communication and the second communication; and means for communicating in accordance with the symbol direction based at least in part on resolving the symbol direction.

In some aspects, a non-transitory computer-readable medium may store one or more instructions for wireless communication. The one or more instructions, when executed by one or more processors of a UE, may cause the one or more processors to: receive a plurality of communications, wherein at least one communication of the plurality of communications is an out-of-order communication; determine a processing action for a communication of the plurality of communications based at least in part on a characteristic of the communication; and perform the processing action based at least in part on determining the processing action for the communication.

In some aspects, a non-transitory computer-readable medium may store one or more instructions for wireless communication. The one or more instructions, when executed by one or more processors of a UE, may cause the one or more processors to: receive a first communication indicating a first symbol direction assignment for at least one symbol; receive a second communication, after the first communication, indicating a second symbol direction assignment for the same at least one symbol; resolve a symbol direction for the at least one symbol based at least in part on the first communication and the second communication; and communicate in accordance with the symbol direction based at least in part on resolving the symbol direction.

In some aspects, an apparatus for wireless communication may include means for receiving a plurality of transmit power control commands identifying a plurality of transmit power values, wherein the plurality of transmit power control commands relate to a set of out-of-order communications; means for determining a transmit power for a communication based at least in part on the plurality of transmit power control commands; and means for transmitting the communication based at least in part on the determining the transmit power.

In some aspects, an apparatus for wireless communication may include means for receiving a plurality of communications, wherein at least one communication of the plurality of communications is an out-of-order communication; means for determining a processing action for a communication of the plurality of communications based at least in part on a characteristic of the communication; and means for performing the processing action based at least in part on determining the processing action for the communication.

In some aspects, a non-transitory computer-readable medium may store one or more instructions for wireless communication. The one or more instructions, when executed by one or more processors of a UE, may cause the one or more processors to: receive a plurality of transmit power control commands identifying a plurality of transmit power values, wherein the plurality of transmit power control commands relate to a set of out-of-order communications; determine a transmit power for a communication based at least in part on the plurality of transmit power control commands; and transmit the communication based at least in part on the determining the transmit power.

Aspects generally include a method, apparatus, system, computer program product, non-transitory computer-readable medium, user equipment, base station, wireless communication device, and processing system as substantially described herein with reference to and as illustrated by the accompanying drawings and/or specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 10-12 are diagrams illustrating example processes performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
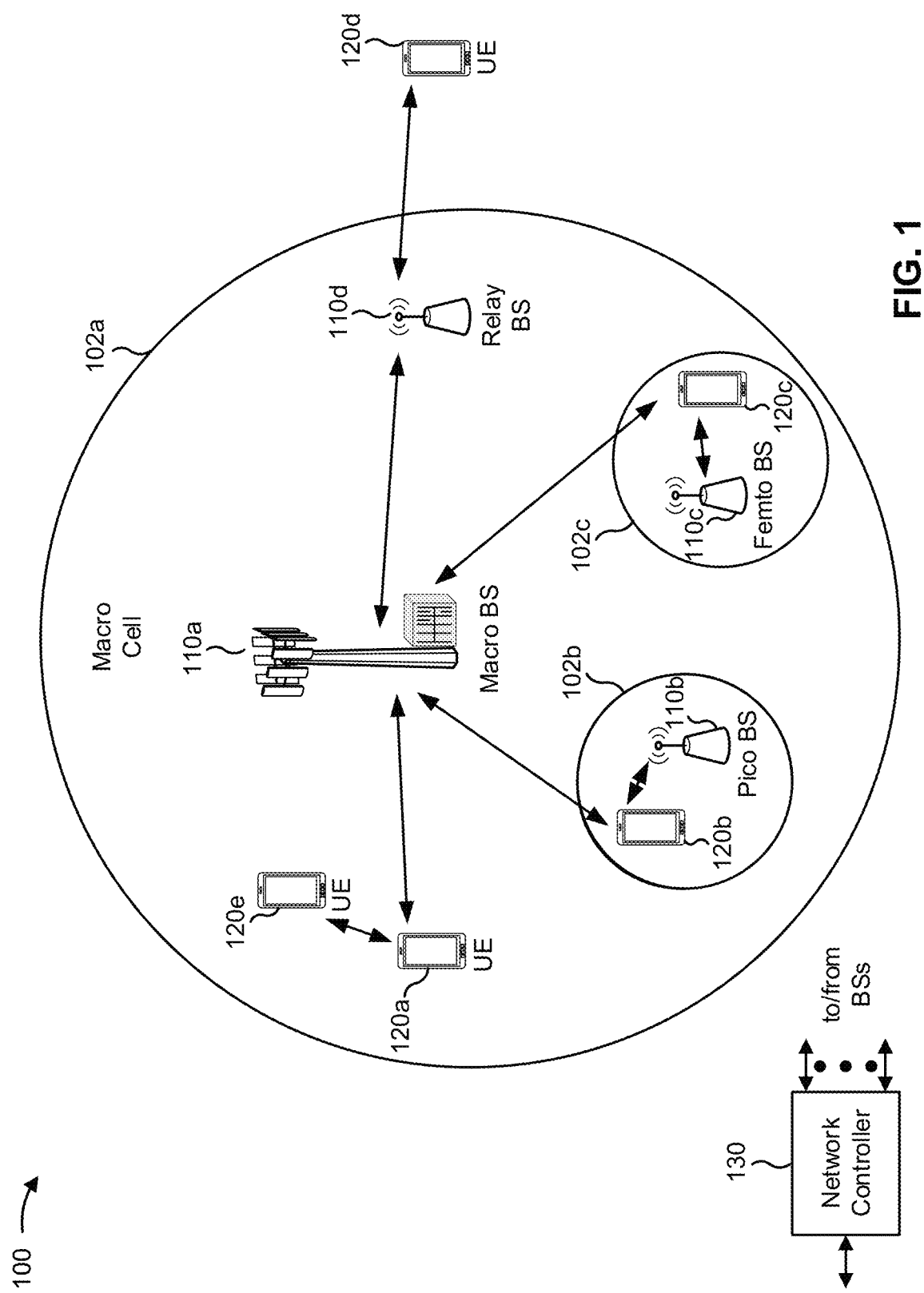
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
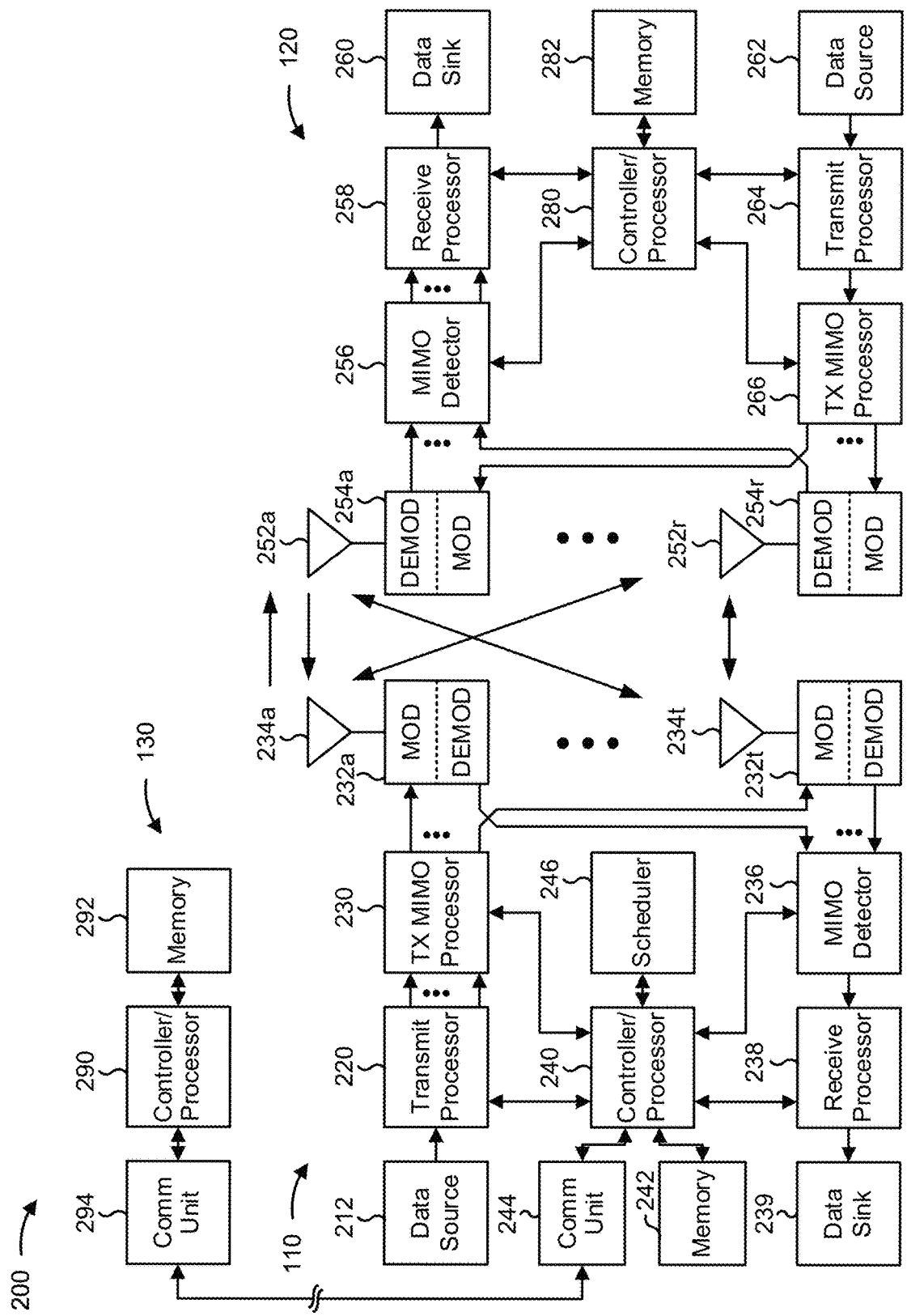
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with out-of-order communication management, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a plurality of transmit power control commands identifying a plurality of transmit power values, wherein the plurality of transmit power control commands relate to a set of out-of-order communications, means for determining a transmit power for a communication based at least in part on the plurality of transmit power control commands, means for transmitting the communication based at least in part on determining the transmit power, and/or the like. In some aspects, UE 120 may include means for receiving a plurality of communications, wherein at least one communication of the plurality of communications is an out-of-order communication, means for determining a processing action for a communication of the plurality of communications based at least in part on a characteristic of the communication, means for performing the processing action based at least in part on determining the processing action for the communication, and/or the like. In some aspects, UE 120 may include means for receiving a first communication indicating a first symbol direction assignment for at least one symbol, means for receiving a second communication, after the first communication, indicating a second symbol direction assignment for the at least one symbol, means for resolving a symbol direction for the at least one symbol based at least in part on the first communication and the second communication, means for communicating in accordance with the symbol direction based at least in part on resolving the symbol direction, and/or the like. In some aspects, such means may include one or more components of UE 120 described in connection with FIG. 2.

As indicated above, FIG. 2 is provided as an example. Other examples may differ from what is described with regard to FIG. 2.

Figure 3A:
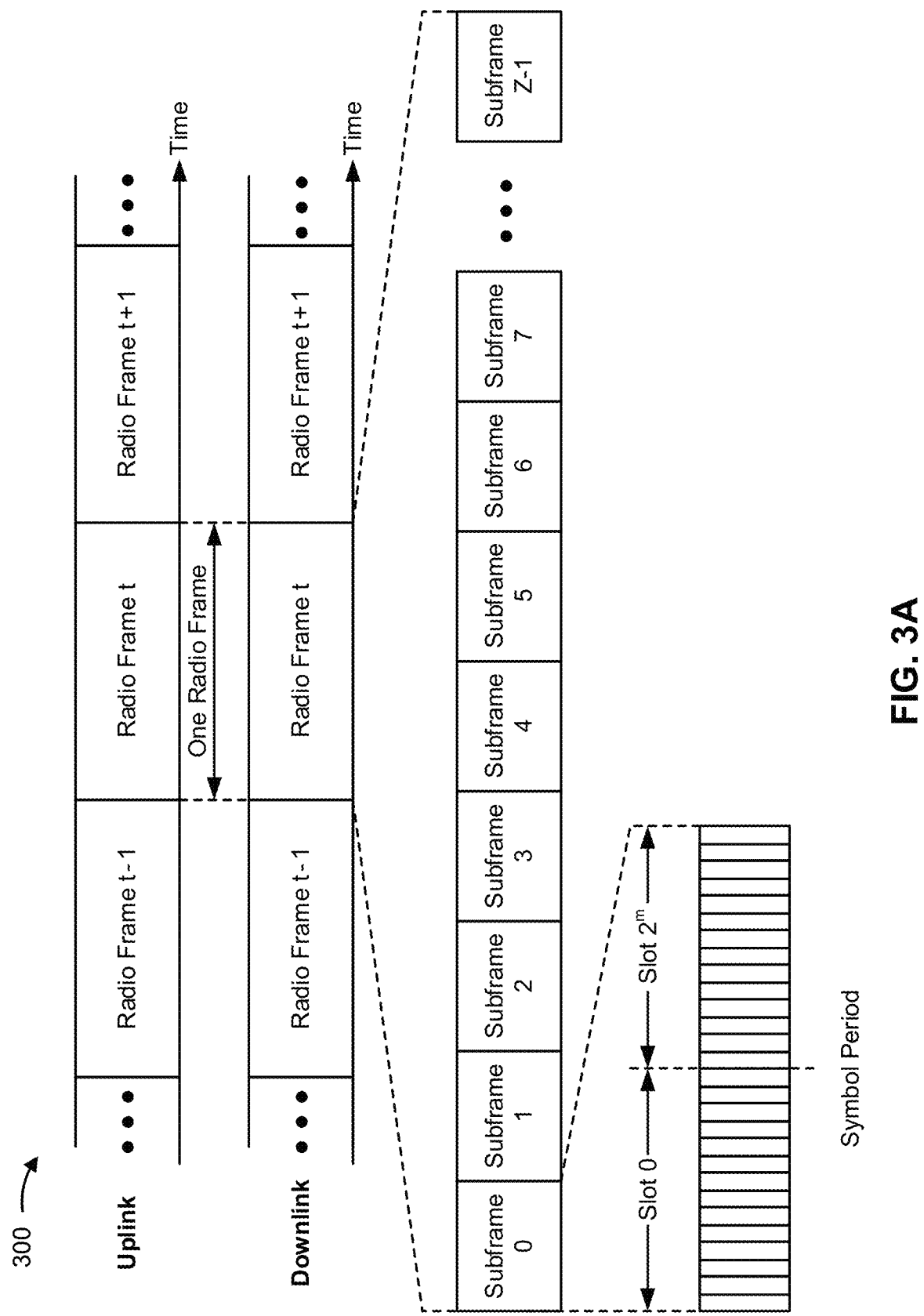
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
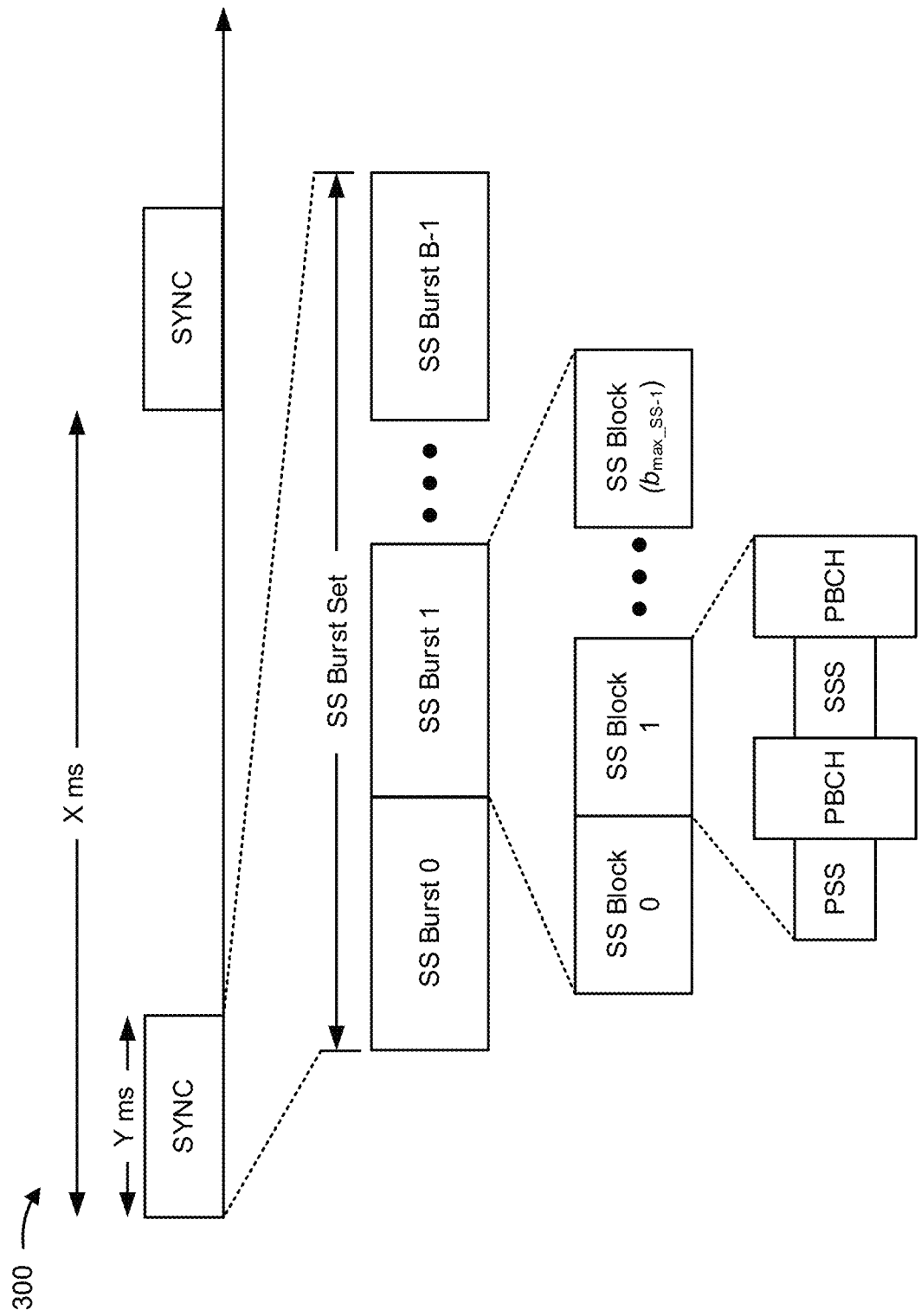
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS}$-1), where $b_{max\_SS}$-1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
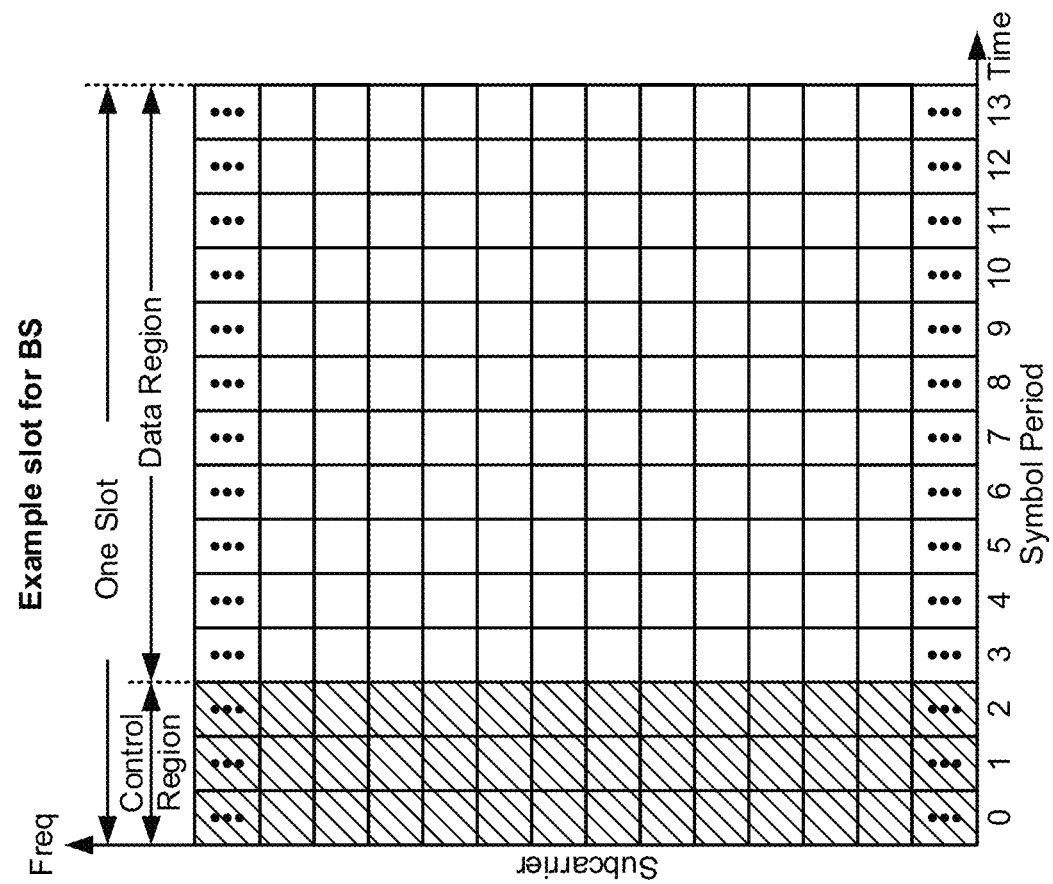
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q ∈ {0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
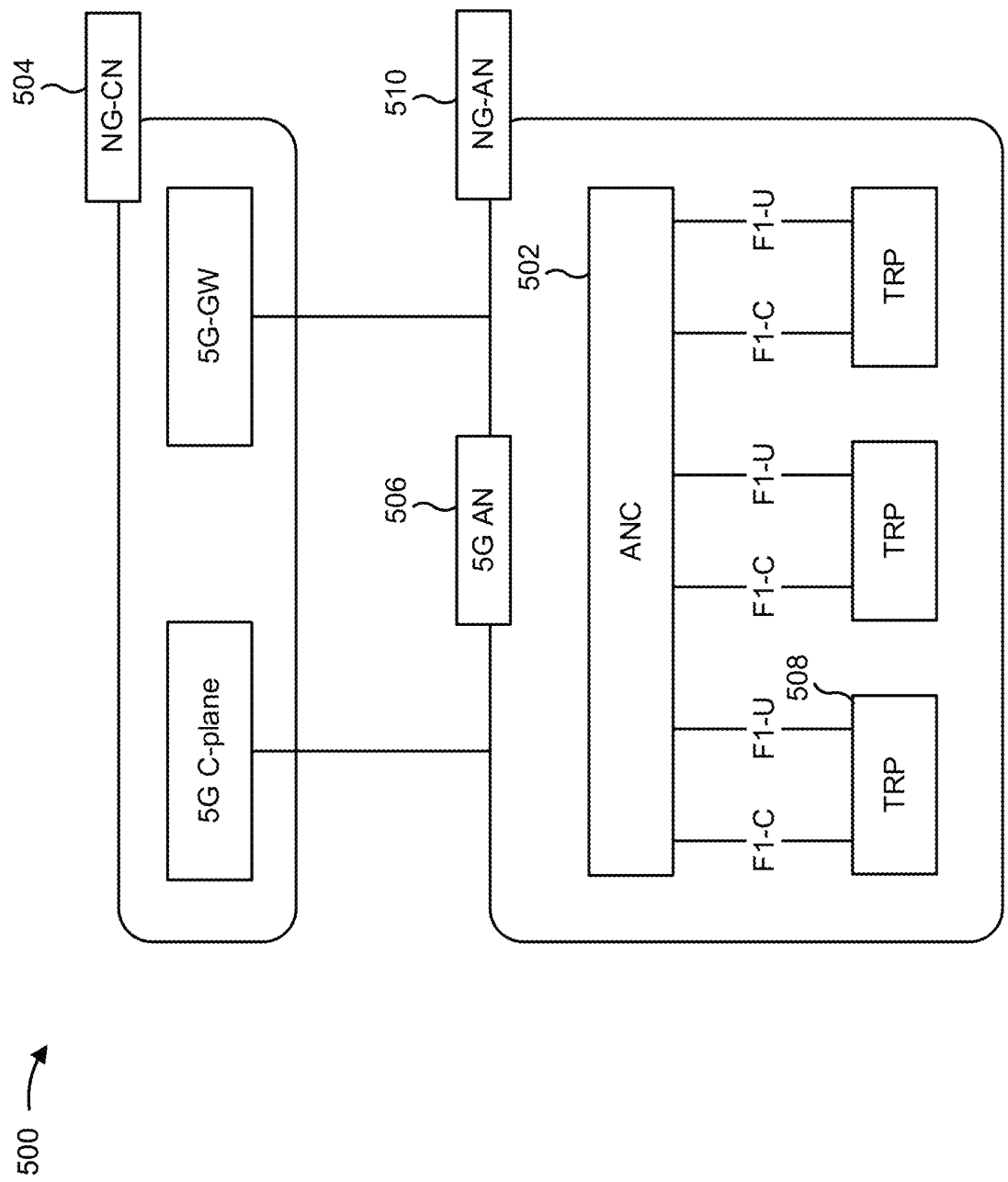
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined to support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
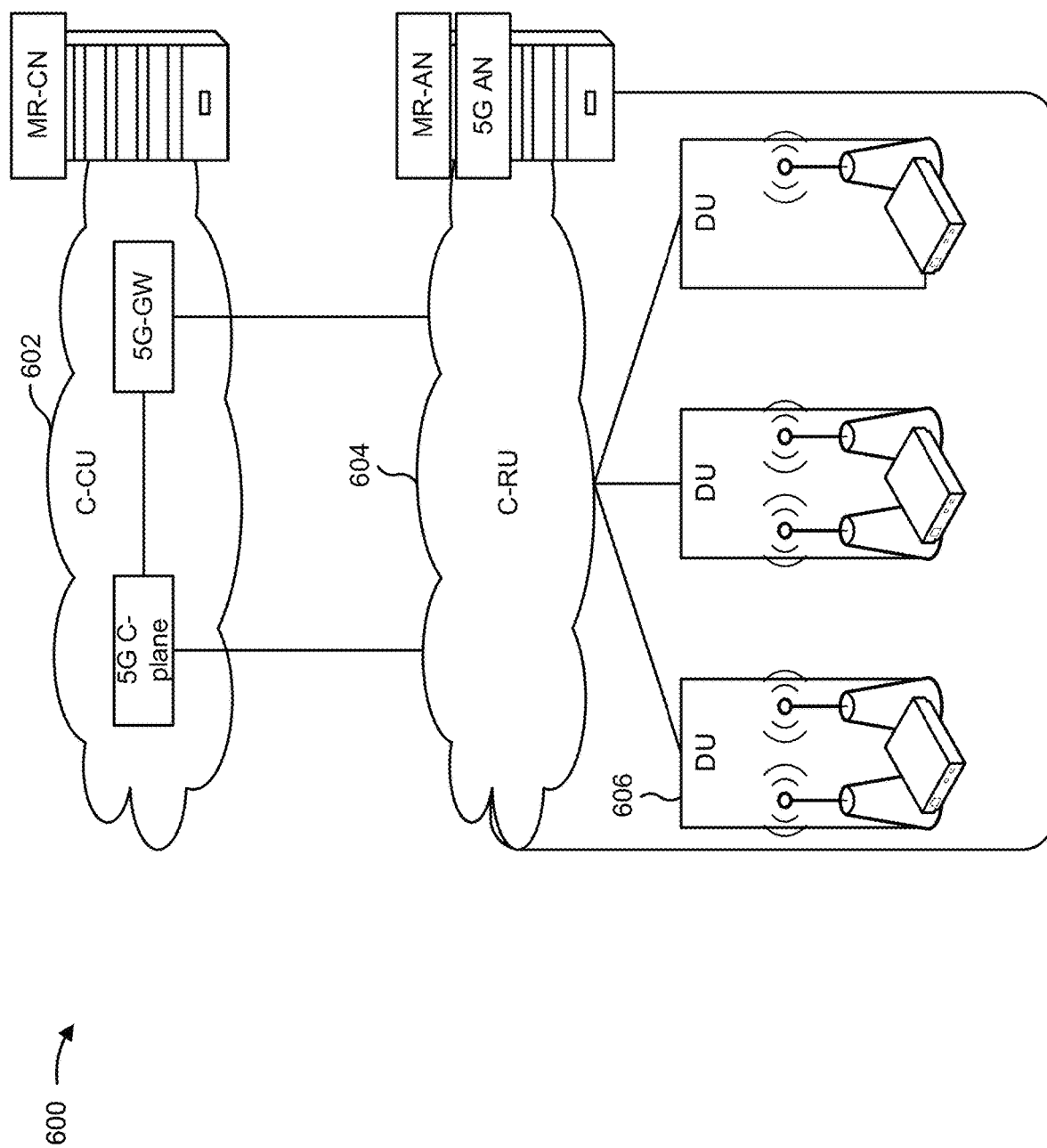
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

In some communications systems, such as New Radio (NR), out-of-order communication may be permitted. For example, hybrid automatic repeat request (HARQ) communications and PUSCH scheduling communications associated with the HARQ communications may be transmitted with different identifiers out-of-order with respect to scheduling (e.g., of a downlink control information (DCI)).

As one example, on an active bandwidth part of a serving cell, a HARQ acknowledgement (ACK, HARQ-ACK), associated with a sequentially second physical downlink shared channel (PDSCH) with a first HARQ process identifier received after a sequentially first PDSCH with a second HARQ process identifier may be transmitted before a HARQ-ACK of the first PDSCH. As another example, a UE may be scheduled with a sequentially second physical uplink shared channel (PUSCH) associated with a first HARQ process for transmission before an ending symbol of a sequentially first PUSCH associated with a second HARQ process. In this case, a scheduling physical downlink control channel (PDCCH) of the second PUSCH may end after an ending symbol of a scheduling PDCCH of the first PUSCH.

However, a power control procedure performed by a UE may be based at least in part on receiving a set of communications in order with respect to, for example, a set of DCIs. Similarly, processing actions for processing channels and associated operations, resolution of flexibly assigned symbol directions signaled by communications, and/or the like may be based at least in part on communication order. As a result, out-of-order communication may result in incorrect transmit power determinations, failure to perform processing actions on communications, failure to resolve symbol direction assignments, and/or the like.

Thus, some aspects described herein provide out-of-order communication management. For example, a UE may determine transmit powers, processing actions, symbol assignment resolutions, and/or the like for out-of-order communications. In this way, the UE may enable out-of-order communication without causing inaccurate power determinations, communication state mismatches, interference, dropped communication, and/or the like.

Figure 7:
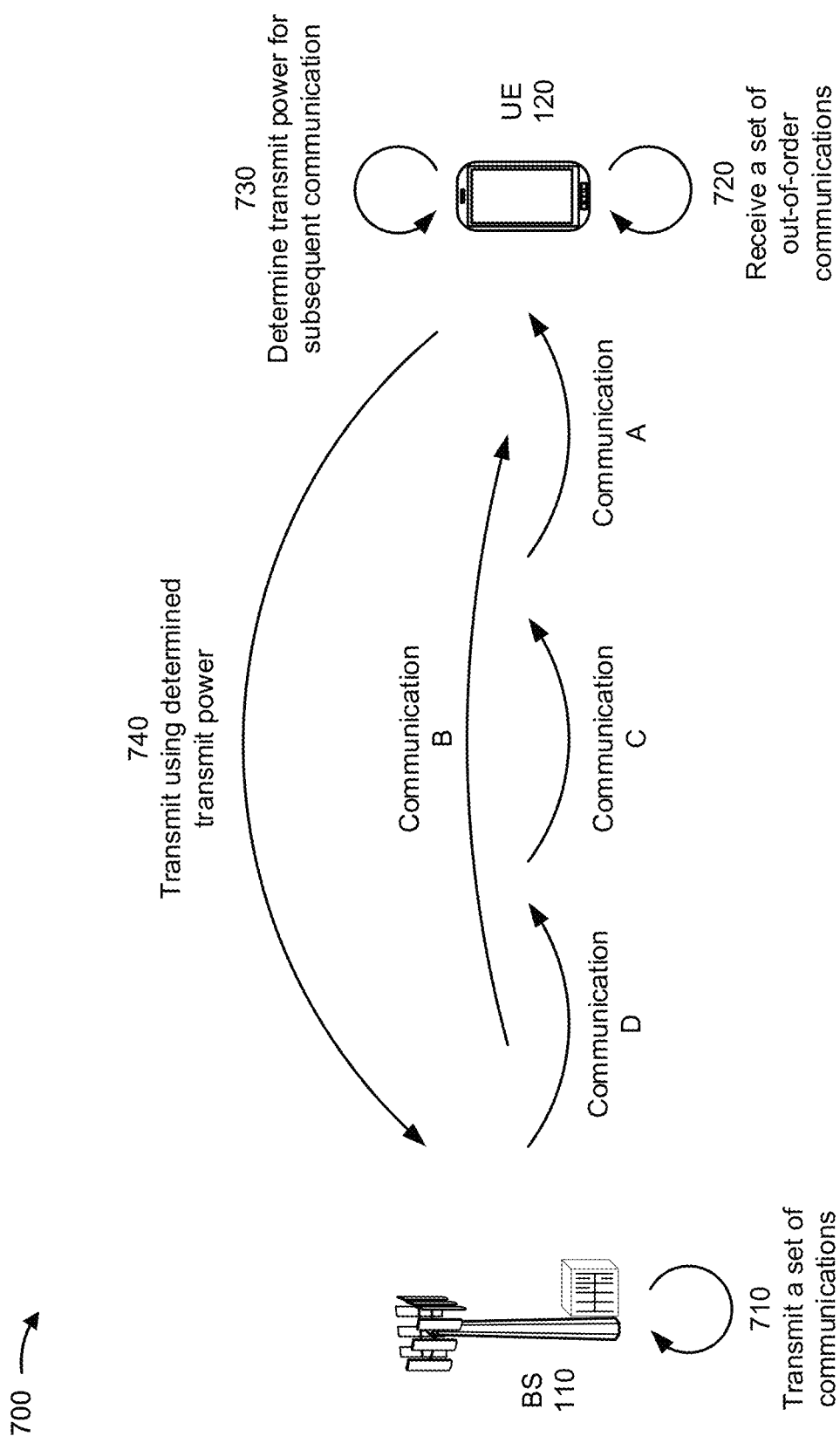
FIGS. 7-9 are diagrams illustrating examples of out-of-order communication management, in accordance with various aspects of the present disclosure.

FIG. 7 is a diagram illustrating an example 700 of out-of-order communication management, in accordance with various aspects of the present disclosure. As shown in FIG. 7, example 700 includes a BS 110 and a UE 120.

As further shown in FIG. 7, and by reference numbers 710 and 720, BS 110 may transmit a set of communications and UE 120 may receive a set of out-of-order communications. For example, BS 110 may transmit a first communication A, a second communication B, a third communication C, and a fourth communication D, such that the communication B is received during communications A, C, and D, resulting in communications B and C being out-of-order. In this case, BS 110 may transmit a set of scheduling downlink control information (DCI) communications identifying an order for a set of, for example, PUSCH communications scheduled by the set of DCI communications. As a result, the set of PUSCH communications (e.g., communications A-D) may be out-of-order with respect to an order identified by the set of scheduling DCI communications. For example, PDCCH communications carrying uplink grants and associated scheduled PUSCHs may be out of order and PDSCHs scheduling for a downlink and associated PUCCHs conveying HARQ-ACK feedback may be out of order.

As further shown in FIG. 7, and by reference number 730, UE 120 may determine a transmit power for subsequent communications based at least in part on the set of out-of-order communications. For example, for one or more loop indices, UE 120 may differentiate the set of out-of-order communications based at least in part on a differentiation parameter, and may determine a set of transmit powers based at least in part on differentiating the set of out-of-order communications. For example, UE 120 may determine that communications A, C, and D are associated with a first priority class and communication B is associated with a second, different priority class. In this case, each communication is in-order with respect to a corresponding priority class. In other words, communications A, C, and D are in-order with respect to each other and communication B is in-order with respect to itself. Alternatively, in a different priority classification, communications A, B, and D may be in-order with respect to each outer and communication C may be in-order with respect to itself. In some aspects, the priority classes and/or classifications may be based at least in part on a control resource set (CORESET) priority or index, a downlink control information (DCI) priority indicator, a DCI size, a configured transmission control indicator (TCI) state, a search space set in which a DCI is received, a value of a CORESET pool index parameter in a CORESET information element, and/or the like.

In some aspects, such as for PUSCH communication, UE 120 may determine a set of priority classes for the set of out-of-order communications based at least in part on a set of sounding reference signal (SRS) resource indicators (SRIs), a set of loop indices, a physical (PHY) layer differentiator, and/or the like. Additionally, or alternatively, such as for PUCCH communication, UE 120 may determine the set of priority classes based at least in part on a DCI format, a bit field of a DCI, a spatial relationship (e.g., a quasi-co-location (QCL) parameter), a closed loop index, an activation command, a bandwidth part, a radio network temporary identifier (RNTI), a respective scheduling time of the communications, DCI size, a configured transmission control indicator (TCI) state, a search space set in which a DCI is received, a value of a CORESET pool index parameter in a CORESET information element, and/or the like, and/or the like.

In some aspects, UE 120 may aggregate transmit power commands (TPCs) corresponding to communications within a single priority class to determine a transmit power for subsequent communications of the single priority class. For example, UE 120 may determine a transmit power for a priority class of communications A, C, and D based at least in part on TPCs of communications A, C, and D, and may separately determine a transmit power for a priority class of communication B based at least in part on a TPC of communication B. In another example, communications D, B, and A may be a lower priority than communication C, so UE 120 may determine a transmit power based at least in part on TPCs of communication D, B, and A, and may separately determine a transmit power for communication C based at least in part on a TPC of communication C.

In some aspects, such as for a single loop index, UE 120 may use an accumulator to determine the transmit power. For example, UE 120 may maintain, for each adjustment state, a single accumulator, and may update the accumulator at a start of a PUSCH to determine a transmit power for the PUSCH. In this case, to update the accumulator, UE 120 may determine a transmit power based at least in part on one or more TPCs not previously included in a transmit power determination associated with the accumulator.

In some aspects, such as if UE 120 is to communicate a plurality of PUSCHs that are overlapping but with a different start, UE 120 may perform a separate update for the accumulator for each PUSCH. Alternatively, if UE 120 is to communicate a plurality of PUSCHs that are overlapping and with the same start, UE 120 may apply a common power control to the plurality of PUSCHs (e.g., based at least in part on a single update to the accumulator). Alternatively, as one or more PUSCHs may be dropped as a result of a restriction of a single PUSCH on a single bandwidth part, UE 120 may drop a lower priority PUSCH and may update a state based at least in part on a previous state and a TPC of a non-dropped PUSCH. In some aspects, UE 120 may determine the transmit power after updating an accumulator. For example, to update the accumulator, UE 120 may use TPCs for each communication associated with a common loop index (e.g., unicast TPCs, group TPCs, and/or the like) to determine a transmit power. In this case, UE 120 may determine the loop index based at least in part on a downlink control information (DCI) format scheduling the plurality of communications from which UE 120 obtains the TPCs or an SRI.

In some aspects, UE 120 may determine the transmit power based at least in part on TPCs received before a start time of an update to an accumulator. For example, UE 120 may determine the transmit power based at least in part on TPCs received before a first symbol of a PUSCH. Additionally, or alternatively, UE 120 may determine the transmit power based at least in part on TPCs received a threshold period of time before the PUSCH, such as a threshold determined based at least in part on a timing capability of a PUSCH sub-channel spacing (SCS), a PUSCH preparation timeline capability, a PUSCH preparation timeline (e.g., type N2 parameter), a PUSCH scheduling timeline (e.g., a type K2 parameter), and/or the like. Additionally, or alternatively, UE 120 may determine the transmit power based at least in part on TPCs received during a threshold time window, and may omit TPCs used for a previous update to an accumulator.

As further shown in FIG. 7, and by reference number 740, UE 120 may communicate with BS 110 based at least in part on determining the transmit power. For example, UE 120 may transmit communications associated with a first class (e.g., associated with communications A, B, and D) using a first transmit power, communications associated with a second class (e.g., associated with communication C) using a second transmit power, and/or the like. Additionally, or alternatively, UE 120 may transmit communications with a transmit power determined based at least in part on an update to an accumulator.

As indicated above, FIG. 7 is provided as an example. Other examples may differ from what is described with respect to FIG. 7.

Figure 8:
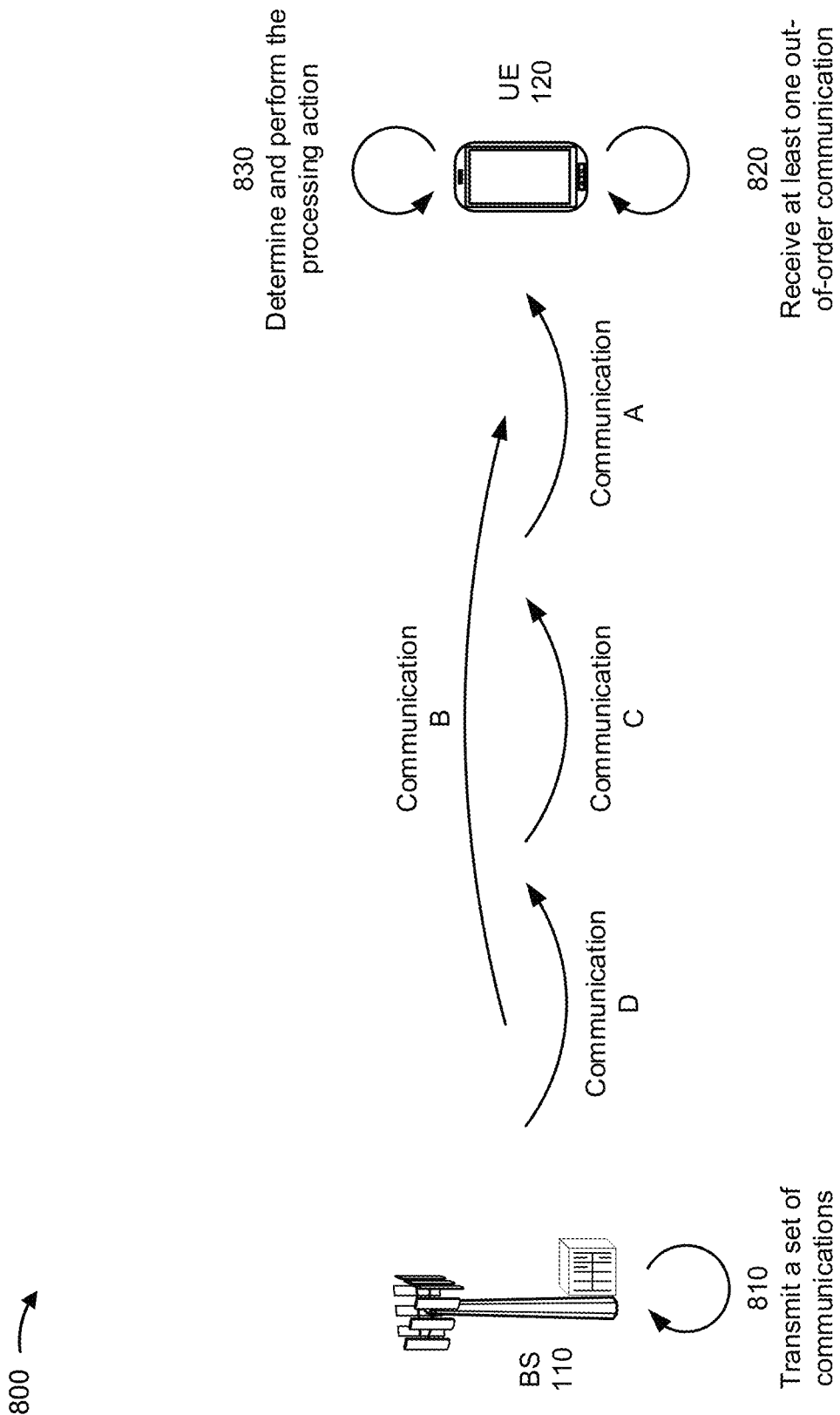

FIG. 8 is a diagram illustrating an example 800 of out-of-order communication management, in accordance with various aspects of the present disclosure. As shown in FIG. 8, example 800 includes a BS 110 and a UE 120.

As further shown in FIG. 8, and by reference numbers 810 and 820, BS 110 may transmit a set of communications, and UE 120 may receive at least one out-of-order communication of the set of communications, as described above. For example, BS 110 may transmit one or more DCIs, one or more PDSCHs, one or more PDCCHs, one or more HARQ communications, and/or the like.

As further shown in FIG. 8, and by reference number 830, UE 120 may determine and perform a processing action for the at least one out-of-order communication. For example, UE 120 may determine to stop processing an out-of-order communication associated with less than a threshold priority class (e.g., a lower priority than one or more other, in-order, communications). In this case, UE 120 may discard a scheduling DCI associated with the out-of-order communication, and may omit a TPC from the scheduling DCI from a transmit power determination. In some aspects, UE 120 may refrain from performing all other operations associated with the out-of-order communication, such as a sounding reference signal (SRS) transmission, an aperiodic channel state information (A-CSI) transmission, and/or the like for the same cell or a different cell. Alternatively, UE 120 may perform some of the other operations associated with the out-of-order communication, all of the other operations associated with the out-of-order communication, and/or the like.

As indicated above, FIG. 8 is provided as an example. Other examples may differ from what is described with respect to FIG. 8.

Figure 9:
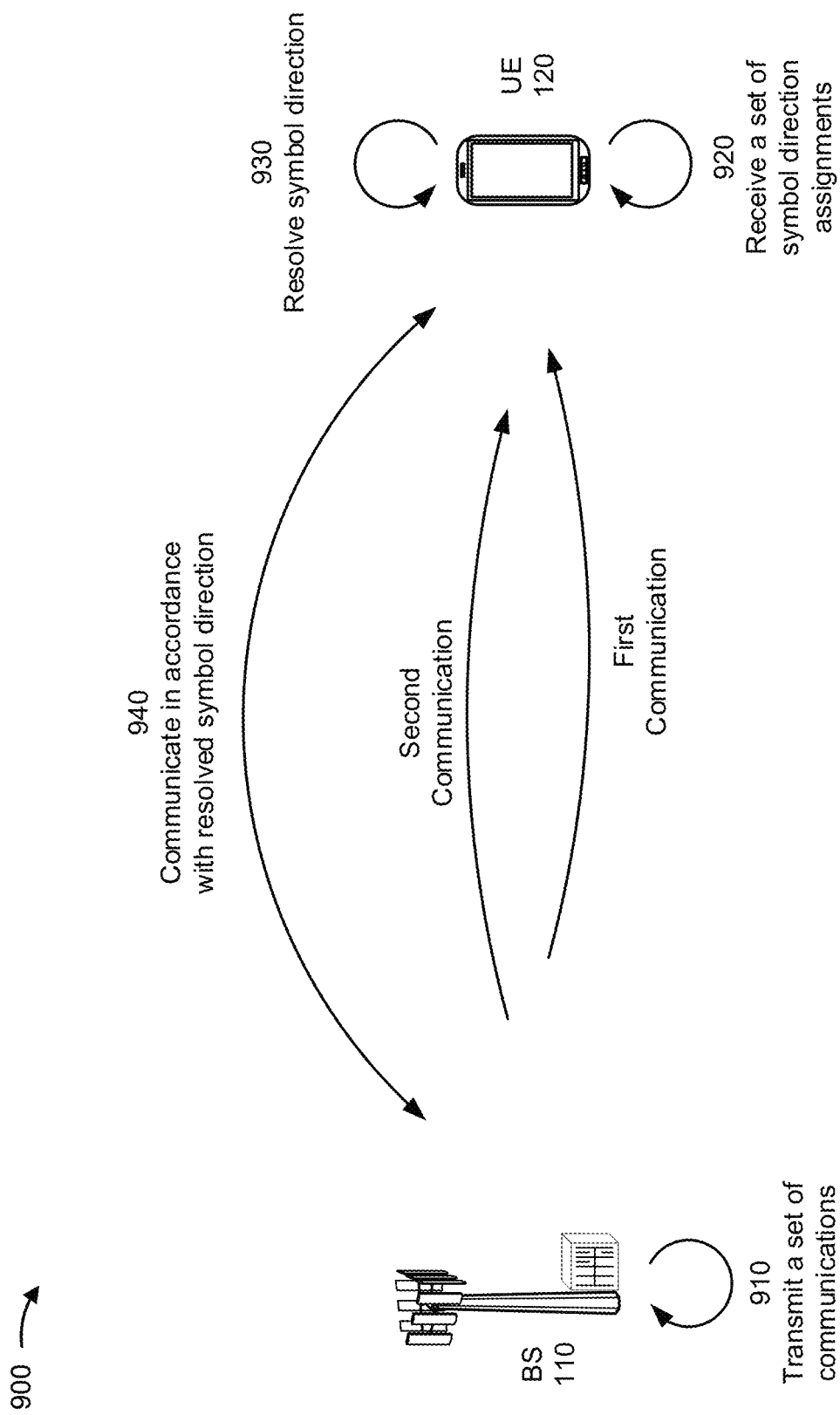

FIG. 9 is a diagram illustrating an example 900 of out-of-order communication management, in accordance with various aspects of the present disclosure. As shown in FIG. 9, example 900 includes a BS 110 and a UE 120.

As further shown in FIG. 9, and by reference numbers 910 and 920, BS 110 may transmit a set of communications that include symbol direction assignments and UE 120 may receive the set of communications. For example, UE 120 may receive a first communication identifying a first symbol direction assignment and a second communication identifying a second symbol direction assignment that conflicts with the first symbol direction assignment. In this case, the first communication may be a first grant indicating a first direction for a flexibly assigned symbol and the second communication may be a second grant indicating a second, different direction for the same flexibly assigned symbol. In some aspects, the symbol direction assignments may be downlink assignments, uplink assignments, flexible assignments, and/or the like.

In some aspects, UE 120 may receive a cell-specific semi-static indication of a symbol direction assignment. For example, UE 120 may receive a system information block (SIB) message identifying a symbol direction assignment. Additionally, or alternatively, UE 120 may receive a UE-specific radio resource control (RRC) message identifying a symbol direction assignment (e.g., to change a symbol that was flexibly assigned by prior cell-specific signaling). Additionally, or alternatively, UE 120 may receive a dynamic system frame information (SFI) indicating a symbol direction assignment for semi-statically, flexibly assigned symbols. Additionally, or alternatively, UE 120 may receive a grant indicating a symbol direction (e.g., a downlink grant or an uplink grant, which may change a flexible symbol to a downlink or uplink symbol based at least in part on whether the grant is a downlink grant or an uplink grant). Additionally, or alternatively, UE 120 may receive another type of UE-specific symbol direction assignment, such as a UE-specific DCI triggered PDSCH, a PUSCH, a PUCCH (e.g., conveying an acknowledgment (ACK) or negative ACK (NACK) for a PDSCH), and/or the like.

As further shown in FIG. 9, and by reference numbers 930 and 940, UE 120 may resolve a symbol direction and may communicate in accordance with the resolved symbol direction. For example, UE 120 may select a symbol direction of a first arriving communication (e.g., the first communication) and may not use a symbol direction of the second arriving communication. Additionally, or alternatively, UE 120 may select a communication associated with a higher priority class, and may use a symbol direction of the selected communication. In this case, a later arriving communication (e.g., the second communication) with a higher priority may change a symbol direction of an earlier arriving communication (e.g., the first communication) with a lower priority. In this way, UE 120 may resolve the symbol direction, thereby enabling communication with BS 110. In some aspects, the second grant does not override a direction given by the first grant if the first transmission is using semi-static downlink and uplink symbols. In this case, flexible symbols, whose direction are set once by one grant, may be changed by a second grant.

As indicated above, FIG. 9 is provided as an example. Other examples may differ from what is described with respect to FIG. 9.

Figure 10:
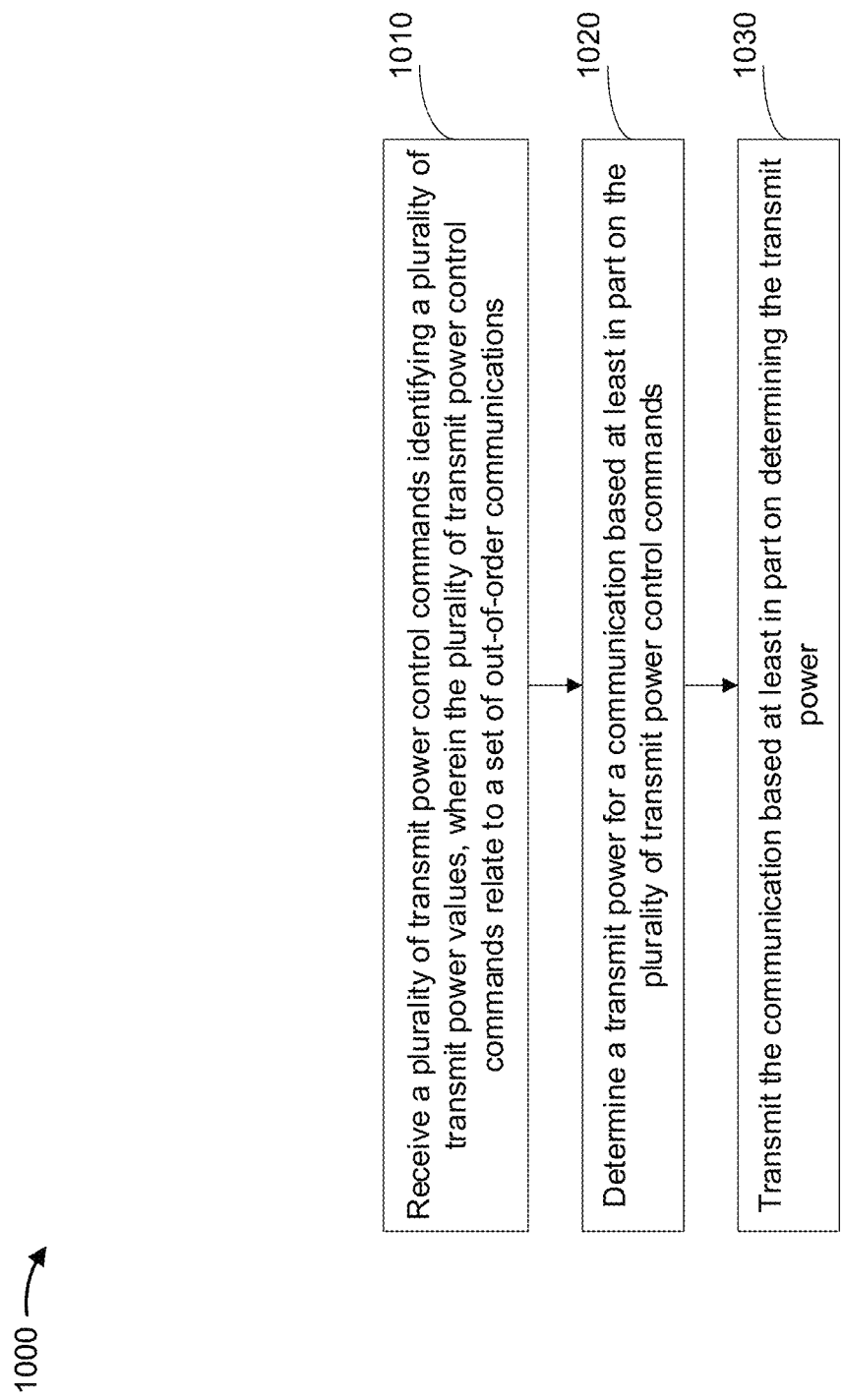

FIG. 10 is a diagram illustrating an example process 1000 performed, for example, by a UE, in accordance with various aspects of the present disclosure. Example process 1000 is an example where a UE (e.g., UE 120 and/or the like) performs operations associated with out-of-order communication management.

As shown in FIG. 10, in some aspects, process 1000 may include receiving a plurality of transmit power control commands identifying a plurality of transmit power values, wherein the plurality of transmit power control commands relate to a set of out-of-order communications (block 1010). For example, the UE (e.g., using receive processor 258, transmit processor 264, controller/processor 280, memory 282, and/or the like) may receive a plurality of transmit power control commands identifying a plurality of transmit power values, as described above. In some aspects, the plurality of transmit power control commands relate to a set of out-of-order communications.

As further shown in FIG. 10, in some aspects, process 1000 may include determining a transmit power for a communication based at least in part on the plurality of transmit power control commands (block 1020). For example, the UE (e.g., using receive processor 258, transmit processor 264, controller/processor 280, memory 282, and/or the like) may determine a transmit power for a communication based at least in part on the plurality of transmit power control commands, as described above.

As further shown in FIG. 10, in some aspects, process 1000 may include transmitting the communication based at least in part on the determining the transmit power (block 1030). For example, the UE (e.g., using receive processor 258, transmit processor 264, controller/processor 280, memory 282, and/or the like) may transmit the communication based at least in part on determining the transmit power, as described above.

Process 1000 may include additional aspects, such as any single implementation or any combination of aspects described below and/or in connection with one or more other processes described elsewhere herein.

In a first aspect, each transmit power command is associated with a class parameter corresponding to a class of a set of classes, and each communication, of the set of out-of-order communications, is in-order with respect to a respective class.

In a second aspect, alone or in combination with the first aspect, determining the transmit power includes determining the transmit power based at least in part on one or more transmit power control commands, of the plurality of transmit power control commands, relating to the same class as the communication.

In a third aspect, alone or in combination with any one or more of the first and second aspects the class parameter is a sounding reference signal resource indicator.

In a fourth aspect, alone or in combination with any one or more of the first through third aspects, the class parameter corresponds to a loop index or a priority, and each loop index or priority is associated with a separate power control accumulation.

In a fifth aspect, alone or in combination with any one or more of the first through fourth aspects, the class parameter corresponds to at least one of a spatial relationship parameter, a channel identifier, or a closed loop index.

In a sixth aspect, alone or in combination with any one or more of the first through fifth aspects, the UE is associated with a plurality of adjustment states and an accumulator, of a set of accumulators, for each adjustment state, and the UE is configured to update a particular accumulator, of the set of accumulators, corresponding to the communication at a start of the communication.

In a seventh aspect, alone or in combination with any one or more of the first through sixth aspects, determining the transmit power includes determining the transmit power for the communication based at least in part on the particular accumulator corresponding to the communication.

In an eighth aspect, alone or in combination with any one or more of the first through seventh aspects, another communication overlapping with the communication and starting at a different start time than the communication is associated with another transmit power determined based at least in part on a different update to the set of accumulators.

In a ninth aspect, alone or in combination with any one or more of the first through eighth aspects, another communication overlapping with the communication and starting at the same start time as the communication is associated with the same transmit power.

In a tenth aspect, alone or in combination with any one or more of the first through ninth aspects, the UE is configured to update the particular accumulator based at least in part on each transmit power control command, of the plurality of transmit power control commands, for the same loop index and received at a threshold time before a start of the update.

In an eleventh aspect, alone or in combination with any one or more of the first through tenth aspects, the threshold time is determined based at least in part on at least one of a first symbol of the communication, a timing capability, or a preparation timeline capability.

In a twelfth aspect, alone or in combination with any one or more of the first through eleventh aspects, the UE is configured to update the particular accumulator based at least in part on each transmit power control command, of the plurality of transmit power control commands, received within an update window.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
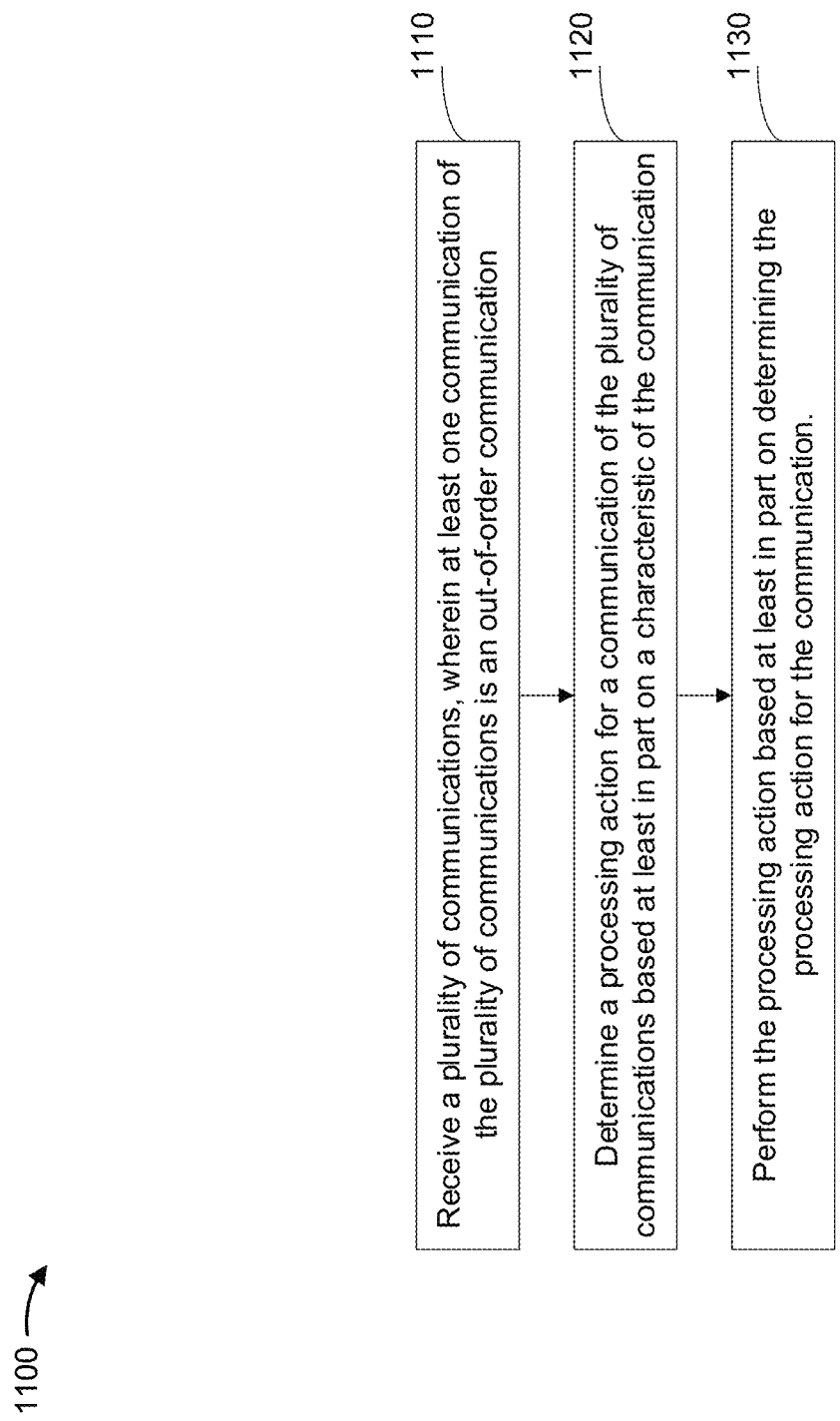

FIG. 11 is a diagram illustrating an example process 1100 performed, for example, by a UE, in accordance with various aspects of the present disclosure. Example process 1100 is an example where a UE (e.g., UE 120 and/or the like) performs operations associated with out-of-order communication management.

As shown in FIG. 11, in some aspects, process 1100 may include receiving a plurality of communications, wherein at least one communication of the plurality of communications is an out-of-order communication (block 1110). For example, the UE (e.g., using receive processor 258, transmit processor 264, controller/processor 280, memory 282, and/or the like) may receive a plurality of communications, as described above. In some aspects, at least one communication of the plurality of communications is an out-of-order communication.

As further shown in FIG. 11, in some aspects, process 1100 may include determining a processing action for a communication of the plurality of communications based at least in part on a characteristic of the communication (block 1120). For example, the UE (e.g., using receive processor 258, transmit processor 264, controller/processor 280, memory 282, and/or the like) may determine a processing action for a communication of the plurality of communications based at least in part on a characteristic of the communication, as described above.

As further shown in FIG. 11, in some aspects, process 1100 may include performing the processing action based at least in part on determining the processing action for the communication (block 1130). For example, the UE (e.g., using receive processor 258, transmit processor 264, controller/processor 280, memory 282, and/or the like) may perform the processing action based at least in part on determining the processing action for the communication, as described above.

Process 1100 may include additional aspects, such as any single implementation or any combination of aspects described below and/or in connection with one or more other processes described elsewhere herein.

In a first aspect, determining the processing action includes determining to stop processing the communication and discard a scheduling downlink control information of the communication based at least in part on a priority of the communication.

In a second aspect, alone or in combination with the first aspect, process 1100 includes determining a transmit power without including a transmit power command of the scheduling downlink control information based at least in part on determining to stop processing the communication and discard the scheduling downlink control information.

In a third aspect, alone or in combination with any one or more of the first and second aspects, process 1100 includes ceasing another operation based at least in part on determining to stop processing the communication and discard the scheduling downlink control information, and the other operation is at least one of a sounding reference signal transmission on the same cell as the communication, a sounding reference signal transmission on a different cell than the communication, an aperiodic channel state information report transmission on the same cell as the communication, or an aperiodic channel state information report transmission on a different cell than the communication.

In a fourth aspect, alone or in combination with any one or more of the first through third aspects, determining the processing action includes determining to stop processing the communication, cease a subset of other operations relating to the communication, and perform another subset of the other operations relating to the communication.

In a fifth aspect, alone or in combination with any one or more of the first through fourth aspects, the other operations relating to the communication include at least one of an aperiodic channel state information report transmission, a sounding reference signal transmission, or a transmit power determination.

In a sixth aspect, alone or in combination with any one or more of the first through fifth aspects, determining the processing action includes determining to stop processing the communication and perform a set of other operations relating to the communication.

In a seventh aspect, alone or in combination with any one or more of the first through sixth aspects, the set of other operations relating to the communication include at least one of an aperiodic channel state information report transmission, a sounding reference signal transmission, or a transmit power determination.

In an eighth aspect, alone or in combination with any one or more of the first through seventh aspects, one or more processing rules associated with the processing action is stored by the UE or configured by a base station (BS).

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a UE, in accordance with various aspects of the present disclosure. Example process 1200 is an example where a UE (e.g., UE 120 and/or the like) performs operations associated with out-of-order communication management.

As shown in FIG. 12, in some aspects, process 1200 may include receiving a first communication indicating a first symbol direction assignment for at least one symbol (block 1210). For example, the UE (e.g., using receive processor 258, transmit processor 264, controller/processor 280, memory 282, and/or the like) may receive a first communication indicating a first symbol direction assignment for at least one symbol, as described above.

As further shown in FIG. 12, in some aspects, process 1200 may include receiving a second communication, after the first communication, indicating a second symbol direction assignment for the same at least one symbol (block 1220). For example, the UE (e.g., using receive processor 258, transmit processor 264, controller/processor 280, memory 282, and/or the like) may receive a second communication, after the first communication, indicating a second symbol direction assignment for the same at least one symbol, as described above.

As further shown in FIG. 12, in some aspects, process 1200 may include resolving a symbol direction for the at least one symbol based at least in part on the first communication and the second communication (block 1230). For example, the UE (e.g., using receive processor 258, transmit processor 264, controller/processor 280, memory 282, and/or the like) may resolve a symbol direction for the at least one symbol based at least in part on the first communication and the second communication, as described above.

As further shown in FIG. 12, in some aspects, process 1200 may include communicating in accordance with the symbol direction based at least in part on resolving the symbol direction (block 1240). For example, the UE (e.g., using receive processor 258, transmit processor 264, controller/processor 280, memory 282, and/or the like) may communicate in accordance with the symbol direction based at least in part on resolving the symbol direction, as described above.

Process 1200 may include additional aspects, such as any single implementation or any combination of aspects described below and/or in connection with one or more other processes described elsewhere herein.

In a first aspect, one of the first communication or the second communication is a downlink control information message, and resolving the symbol direction includes resolving the symbol direction based at least in part on the downlink control information message.

In a second aspect, alone or in combination with the first aspect, resolving the symbol direction includes resolving the symbol direction based at least in part on relative priorities of the first communication and the second communication.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving a plurality of transmit power control commands identifying a plurality of transmit power values,
        wherein the plurality of transmit power control commands relate to a set of out-of-order communications, and
        wherein each transmit power control command, of the plurality of transmit power control commands, is associated with a class parameter corresponding to a priority class of a set of priority classes;
    determining a first transmit power for a first communication based at least in part on two or more transmit power control commands, of the plurality of transmit power control commands, relating to a same priority class as the first communication;
    determining a second transmit power for a second communication based at least in part on one or more transmit power control commands, of the plurality of transmit power control commands, relating to a same priority class as the second communication;
    transmitting the first communication based at least in part on the determining of the first transmit power; and
    transmitting the second communication based at least in part on the determining of the second transmit power.

2. The method of claim 1, wherein each communication, of the set of out-of-order communications, is in-order with respect to a respective priority class.

3. The method of claim 1, wherein the class parameter is a sounding reference signal resource indicator.

4. The method of claim 1, wherein the class parameter is based at least in part on at least one of a priority, an index value, or a characteristic of a communication, and wherein each of the at least one of the priority, the index value, or the characteristic of a communication is associated with a separate power control accumulation.

5. The method of claim 1, wherein the class parameter corresponds to at least one of a spatial relationship parameter, a channel identifier, or a closed loop index.

6. The method of claim 1, wherein the UE is associated with a plurality of adjustment states and an accumulator, of a set of accumulators, for each adjustment state, and
wherein the UE is configured to update a particular accumulator, of the set of accumulators, corresponding to the first communication at a start of the first communication.

7. The method of claim 6, wherein determining the first transmit power comprises:
determining the first transmit power for the first communication based at least in part on the particular accumulator corresponding to the first communication.

8. The method of claim 6, wherein the second communication overlaps with the first communication and starts at a different start time than the first communication, and
wherein the second transmit power is determined based at least in part on a different update to the set of accumulators.

9. The method of claim 1, wherein the second communication overlaps with the first communication and starts at a same start time as the first communication, and
wherein the second transmit power is associated with a same transmit power as the first transmit power.

10. The method of claim 6, wherein the UE is configured to update the particular accumulator based at least in part on each transmit power control command, of the plurality of transmit power control commands, for a same loop index and received at a threshold time before a start of updating the particular accumulator.

11. The method of claim 10, wherein the threshold time is determined based at least in part on at least one of a first symbol of the first communication, a timing capability, or a preparation timeline capability.

12. The method of claim 6, wherein the UE is configured to update the particular accumulator based at least in part on each transmit power control command, of the plurality of transmit power control commands, received within an update window.

13. A method of wireless communication performed by a user equipment (UE), comprising:
receiving a plurality of communications, wherein at least one communication of the plurality of communications is an out-of-order communication;
determining a processing action for a communication of the plurality of communications based at least in part on a characteristic of the communication,
wherein determining the processing action comprises:
determining to stop processing the communication and discard a scheduling downlink control information of the communication based at least in part on a priority of the communication;
performing the processing action based at least in part on determining the processing action for the communication: and
determining a transmit power without including a transmit power command of the discarded scheduling downlink control information based at least in part on performing the processing action.

14. The method of claim 13, further comprising:
ceasing another operation based at least in part on determining to stop processing the communication and discard the scheduling downlink control information, and
wherein the other operation is at least one of:
a sounding reference signal transmission on a same cell as the communication,
a sounding reference signal transmission on a different cell than the communication,
an aperiodic channel state information report transmission on the same cell as the communication, or
an aperiodic channel state information report transmission on a different cell than the communication.

15. The method of claim 13, wherein determining the processing action further comprises:
determining to cease a subset of other operations relating to the communication and perform another subset of the other operations relating to the communication.

16. The method of claim 15, wherein the other operations relating to the communication include at least one of:
an aperiodic channel state information report transmission,
a sounding reference signal transmission, or
a transmit power determination.

17. The method of claim 13, wherein determining the processing action further comprises:
determining to perform a set of other operations relating to the communication.

18. The method of claim 17, wherein the set of other operations relating to the communication include at least one of:
an aperiodic channel state information report transmission,
a sounding reference signal transmission, or
a transmit power determination.

19. The method of claim 13, wherein one or more processing rules associated with the processing action is stored by the UE or configured by a base station (BS).

20. A user equipment (UE) for wireless communication, comprising:
a memory; and
one or more processors operatively coupled to the memory, the memory and the one or more processors configured to:
receive a plurality of transmit power control commands identifying a plurality of transmit power values,
wherein the plurality of transmit power control commands relate to a set of out-of-order communications, and
wherein each transmit power control command, of the plurality of transmit power control commands, is associated with a class parameter corresponding to a priority class of a set of priority classes;
determine a first transmit power for a first communication based at least in part on two or more transmit power control commands, of the plurality of transmit power control commands, relating to a same priority class as the first communication;
determine a second transmit power for a second communication based at least in part on one or more transmit power control commands, of the plurality of transmit power control commands, relating to a same priority class as the second communication;
transmit the first communication based at least in part on the determining of the first transmit power; and transmit the second communication based at least in part on the determining of the second transmit power.

21. The UE of claim 20, wherein each communication, of the set of out-of-order communications, is in-order with respect to a respective class.

22. The UE of claim 20, wherein the class parameter is a sounding reference signal resource indicator.

23. The UE of claim 20, wherein the UE is associated with a plurality of adjustment states and an accumulator, of a set of accumulators, for each adjustment state, and
wherein the UE is configured to update a particular accumulator, of the set of accumulators, corresponding to the second communication at a start of the second communication.

24. A user equipment (UE) for wireless communication, comprising:
a memory; and
one or more processors operatively coupled to the memory, the memory and the one or more processors configured to:
receive a plurality of communications, wherein at least one communication of the plurality of communications is an out-of-order communication;
determine a processing action for a communication of the plurality of communications based at least in part on a characteristic of the communication,
wherein the one or more processors, when determining the processing action, are to:
determine to stop processing the communication and discard a scheduling downlink control information of the communication based at least in part on a priority of the communication;
perform the processing action based at least in part on determining the processing action for the communication; and
determine a transmit power without including a transmit power command of the scheduling downlink control information based at least in part on determining to stop processing the communication and discard the scheduling downlink control information.

25. The method of claim 1, further comprising:
aggregating the two or more transmit power control commands based at least in part on communications, corresponding to the two or more transmit power control commands, being within a single priority class.

26. The method of claim 13, wherein determining to stop processing the communication comprises:
determining to stop processing the communication based at least in part on the priority of the communication being a lower priority than one or more other communications.

27. The UE of claim 20, wherein the one or more processors are further configured to:
aggregate the two or more transmit power control commands based at least in part on communications, corresponding to the two or more transmit power control commands, being within a single priority class.

28. The UE of claim 24, wherein the one or more processors, when determining to stop processing the communication, are configured to:
determine to stop processing the communication based at least in part on the priority of the communication being a lower priority than one or more other communications.

29. The UE of claim 23, wherein the one or more processors, when determining the second transmit power, are configured to:
determine the second transmit power for the second communication based at least in part on the particular accumulator corresponding to the second communication.

30. The UE of claim 24, wherein the one or more processors, when determining the processing action are configured to:
determine to cease a subset of other operations relating to the communication and perform another subset of the other operations relating to the communication.

* * * * *